United States Patent [19]

Degenhardt et al.

[11] Patent Number: 5,586,180
[45] Date of Patent: Dec. 17, 1996

[54] METHOD OF AUTOMATIC SPEECH DIRECTION REVERSAL AND CIRCUIT CONFIGURATION FOR IMPLEMENTING THE METHOD

[75] Inventors: Achim Degenhardt, München; Thomas Henkel, Oberpframmern, both of Germany

[73] Assignee: Siemens Aktiengesellschaft, Munich, Germany

[21] Appl. No.: 300,430

[22] Filed: Sep. 2, 1994

[30] Foreign Application Priority Data

Sep. 2, 1993 [DE] Germany .......................... 43 29 694.7
Feb. 4, 1994 [DE] Germany .......................... 44 03 532.2

[51] Int. Cl.$^6$ .................................................. H04M 1/60
[52] U.S. Cl. .......................... 379/389; 379/395; 379/388; 395/2.34
[58] Field of Search ................................. 395/2.34–2.37; 379/389, 388, 390, 395, 420, 206

[56] References Cited

U.S. PATENT DOCUMENTS 4,542,263  9/1985  Mitani ........................................ 379/395
5,199,065  3/1993  Zitzewitz et al. ........................ 379/389

FOREIGN PATENT DOCUMENTS 0423537  4/1991  European Pat. Off. ......... H04M 9/10

Primary Examiner—Kee M. Tung
Attorney, Agent, or Firm—Herbert L. Lerner; Laurence A. Greenberg

[57] ABSTRACT

In a method and a circuit for automatic speech direction reversal a reception signal with variable damping is furnished to a loudspeaker and a signal with a variable damping from a microphone is provided as the transmission signal. The reception signal and microphone signal are continuously classified as speech signal or noise. The one signal which is classified as a speech signal, is damped at a first damping value and the other signal is damped at a second damping value, which is greater than the first. These settings are maintained until a signal is classified as noise. When both signals are classified as speech signals, the preceding damping values are retained. When both signals are classified as noise, both attenuations are set at a third damping value located between the first and second damping values. A transition from the first or second damping value to the third damping value is performed more slowly than a transition from the third damping value to the first or second damping value or a transition from the first to the second damping value, and vice versa.

24 Claims, 2 Drawing Sheets

METHOD OF AUTOMATIC SPEECH DIRECTION REVERSAL AND CIRCUIT CONFIGURATION FOR IMPLEMENTING THE METHOD

BACKGROUND OF THE INVENTION

1. Field of the Invention

The invention pertains to a method for automatic speech direction reversal whereby a reception signal with variable damping is supplied to a loudspeaker, whereby a signal put out by a microphone with a variable damping is provided as the transmission signal, whereby reception signal and microphone signal are each continuously classified as speech signal or noise, whereby the damping or attenuation of each signal that has been classified as a speech signal is adjusted to a first damping value and the other signal is adjusted to an damping value that is greater than the first, whereby in the event that both signals are classified as speech signals the previous damping values are retained, whereby in the event that both signals are classified as noise both attenuations are adjusted to a third damping value located between the first and second damping values.

The invention further pertains to a circuit configuration for implementing the method with a controllable reception attenuator, at whose input the reception signal is present and at whose output a loudspeaker signal for driving the loudspeaker is present, a controllable transmission attenuator, at whose input the microphone signal is present and at whose output the transmission signal is present, two signal/noise detectors, to one of which the reception signal or the loudspeaker signal and to the other the microphone signal or the transmission signal is supplied, and which classify the reception signal and the transmission signal continuously as speech signal or noise, and with a control logic to control the reception attenuator and the transmission attenuator, connected to the signal/noise detectors, which in one case sets the damping of the signal path whose signal has been classified as a speech signal at a first damping value and the other signal (Tx, Rx) at a second damping value larger than the first, in the event that both signals are classified as speech signals it retains the preceding damping values, and in the event that both signals are classified as noise it sets a third damping value between the first and second damping values.

Convenience and demand for comfort in telephones has greatly increased in recent years. Automatic redialling, speed dialling, and loudspeaker address are virtually standard features. The option of speaking without the use of the handset, i.e. a speakerphone, has also become a desired function of the telephone. Besides its use in the private realm, this function finds many meaningful applications, for example, in the field of office communication, as in teleconferencing, for use in automobiles, or in any other circumstances in which the hands-free telephone operation is desireable.

The fundamental difference between a normal telephone with handset and a speakerphone consists in the mode of operation: the former works in duplex mode, wherein simultaneous transmission is effected in both directions, i.e. sending and receiving. With a speakerphone, this is only possible with a very costly and unsatisfactory method. Owing to the high degree of signal amplification in both directions, any attempt to converse in duplex mode would immediately result in a strong feedback whistling, since a closed loop is produced by the acoustic coupling between the loudspeaker and the microphone. Therefore, speakerphones can only work in simplex mode, i.e. only one of the two parties can talk while the other listens. To accomplish this, one requires a circuit which determines who is speaking and then switches through the particular channel and adequately attenuates the other one. Thus, the loop amplification is kept below unity. When the telephone parties exchange roles, the circuit must determine this immediately and switch over to the appropriate channel. The circuit then works automatically in hands-free speakerphone mode with the help of a speech direction recognition in conjunction with an electronic reversing switch.

2. Description of the Related Art

A method and a circuit configuration for automatic reversal of speech direction in telephones is known, for example, from U.S. Pat. No. 5,199,065 (corresponding European Patent 0 423 537), assigned to Siemens Aktiengesellschaft.

In that method and circuit configuration, the currently inactive channel is damped relative the active channel. This means that the person who is speaking cannot hear his telephone counterpart. In addition, it is also possible to activate a so-called idle condition in which both channels are operated at half the maximum attenuation. In the event that both participants are silent or if the speaker is drowned out by noise at the listener's location, the system slowly goes to the idle state (slow idle). In the event that the speaker and the loudspeaker have roughly the same level, on the other hand, the system goes quickly to the idle state (fast idle). A speech direction reversal is only possible if the person presently speaking stops, and the person presently listening speaks.

Thus, it is not possible to interrupt the speaker. If an error signal occurs in the receiving branch, which is wrongly classified as a speech signal, it is no longer possible to even reverse the speech direction.

SUMMARY OF THE INVENTION

It is accordingly an object of the invention to provide a method of automatic speech direction reversal and circuit configuration for implementing the method, which overcomes the hereinafore-mentioned disadvantages of the heretofore-known methods and devices of this general type and which does not have the above shortcomings.

With the foregoing and other objects in view there is provided, in accordance with the invention, a method of automatic speech direction reversal, which comprises:

supplying a reception signal with variable damping to a loudspeaker, outputting a microphone signal with variable damping from a microphone as a transmission signal, continuously classifying each of the reception signal and the microphone signal as a speech signal or noise, setting a damping of one of the receive and transmission signals classified as a speech signal to a first damping value, setting the damping of the other of the receive and transmission signals to a second damping value being greater than the first damping value, maintaining the set damping values if both signals are classified as a speech signal, setting a damping of both receive and transmission signals to a third damping value lying between the first and second damping values, if both receive and transmission signals are classified as noise, comparing the variably damped signal supplied to the loudspeaker and the microphone signal to one another with regard to a value which can be correlated with a particular signal loudness, setting the damping of the microphone signal to the first damping value and the damping of the reception signal to the second damping value, if the damping of the microphone signal is set to the second damping value and in an event that the microphone signal which has been recognized as a speech signal is louder than the loudspeaker signal by a given, first difference; or maintaining the previous damping values; and setting the damping of the reception signal at the first damping value and the damping of the microphone signal at the second damping value if the damping of the reception signal is set at the second damping value and in the event that the reception signal recognized as the speech signal is louder than the transmission signal by a second, given difference; or, maintaining the previous damping values.

In accordance with another feature of the invention, the quantity correlated with the particular signal loudness is in the form of a particular signal amplitude multiplied by a weighting factor.

In accordance with an added feature of the invention, the transition from one of the first and second damping values to the third damping value is performed more slowly than a transition from the third damping value to one of the first and second damping value and more slowly than a transition from the first to the second damping value, and from the second to the first damping value.

In accordance with an additional feature of the invention, the method includes waiting for a given delay time before a transition is performed for one of the reception signal and the microphone signal from one of the first and second damping values to the third damping value, after a change from a speech signal to noise is detected.

In accordance with a further feature of the invention, the method includes the following substeps in the step described as continuously classifying:

defining a value for the signal;

companding an amplitude thereof;

processing through a first low-pass filter with given time constants;

processing through a second low-pass filter with given time constants;

comparing the signal before the second low-pass filter, after subtracting an adjustable offset signal, to the signal after the second low-pass filter;

classifying the signal as a speech signal if the signal before the second low-pass filter, after subtracting the offset signal, is greater than the signal after the second low-pass filter, and classifying the signal as noise if the signal after the second low-pass filter is greater than the signal before the second low-pass filter, after subtracting the offset signal.

In accordance with yet an added feature of the invention, a peak-value detection is performed with two alternative fading time constants after the first low-pass filter, two alternative time constants are provided during the second low-pass filter, and the greater time constant is set for the peak-value detector and the second low-pass filter if the signal is classified as a speech signal, and the smaller time constant is set if the signal is classified as noise.

In accordance with yet an additional feature of the invention, the time constant of the first low-pass filter for the microphone signal is set to be greater than the time constant for the reception signal.

In accordance with yet a further feature of the invention, the method further comprises setting an internal condition for one of the microphone signal and the reception signal during the second low-pass filtering at an amplitude value being greater than an instantaneous amplitude value of the particular signal, if the classification of the reception signal or the microphone signal changes from speech signal to noise and the particular signal is classified as noise. Preferably, the internal condition during the second low-pass filtration is set at a maximum amplitude value.

In accordance with again an added feature of the invention, the reception signal and the microphone signal are input into respective ones of two signal/noise detectors as input signals, and the method further comprises increasing an offset signal of one of the signal/noise detectors if the other of the two signal/noise detectors classifies its input signal as a speech signal. Also, after switching from voice to noise in one signal/noise detector, the instantaneous amplitude value of the other signal/noise detector is maintained for a given time.

In accordance with a preferred mode of the invention, the signals are processed by time- and amplitude-discrete signal processing.

In accordance with again a further feature of the invention, the method further comprises, during at least one of the first and second low-pass filter, multiplying the time- and amplitude-discrete signal being filtered by a given factor to form a product, adding the product to a delayed and filtered time- and amplitude-discrete signal to form a sum, and subtracting from the sum the delayed and filtered signal multiplied by the given factor.

In accordance with another mode of the invention, the given factor is set equal to an n-th power of 2, and the multiplying step is modelled or replaced with a shift operation by n places. The term n is an integer.

In accordance with yet an additional feature of the invention, the method further comprises performing a transition from the second damping value to the third damping value by continuously subtracting an instantaneous damping value, arithmetically shifted to the right by k places, from the instantaneous damping value until the third damping value is reached, and performing a transition from the first damping value to the third damping value by continuously adding the instantaneous value, arithmetically shifted to the right by k places, until the third damping value is reached. The term k is an integer.

In accordance with a concomitant mode of the invention, the method also comprises performing a transition from the second damping value to the third damping value by continuously subtracting an instantaneous damping value, arithmetically shifted to the right by k places, from the instantaneous damping value until the third damping value is attained, and performing a transition from the first damping value to the third damping value by continuously adding the instantaneous value, arithmetically shifted to the right by k places, until the third damping value is attained.

In other words, the signal supplied to the loudspeaker and the microphone signal are compared with one another, as are the transmission signal and the reception signal, with regard to a quantity to be assigned to the particular signal loudness. Starting out from an attenuation of the microphone signal at the second damping value, its attenuation—if it is determined to be a speech signal which is louder than the loudspeaker signal by a particular first differential—is adjusted to the first damping value and the attenuation of the reception signal is adjusted to the second damping value. Otherwise, the former attenuations are maintained. Starting out from an attenuation of the reception signal at the second damping value—if it is determined to be a speech signal which is louder than the transmission signal by a particular second differential—is adjusted to the first damping value and the attenuation of the microphone signal is adjusted to the second damping value. Otherwise, the former attenuations are maintained.

With the above and other objects in view, there is also provided, in accordance with the invention, an improvement in a circuit configuration for automatic speech direction reversal, of the type having a loudspeaker; a controllable reception attenuator having an input receiving a reception signal and an output supplying a loudspeaker signal activating the loudspeaker; a microphone supplying a microphone signal; a controllable transmission attenuator having an input receiving the microphone signal and an output supplying a transmission signal; a first signal/noise detectors receiving the reception signal or the loudspeaker signal and a second signal/noise detector receiving the microphone signal or the transmission signal; wherein the reception signal and the transmission signal are continuously classified as speech signal or noise; and having a control logic connected at outputs of the signal/noise detectors and controlling the reception and transmission attenuators, wherein the control logic sets a damping of a particular signal branch whose signal has been classified as a speech signal to a first damping value and the other particular signal to a second damping value being higher than the first, and when both signals are classified as noise, the control logic sets a third damping value located between the first and second damping values.

The improvement comprises: a comparator circuit connected to the control logic, the comparator circuit having means for comparing the loudspeaker signal with the microphone signal, and the transmission signal with the reception signal, with respect to a quantity that can be correlated with a particular signal loudness;

the control logic having means for:
  setting a damping of the transmission attenuator to the first damping value and the damping of the reception attenuator to the second damping value, if the transmission attenuator is set at the second damping value and the microphone signal recognized as a speech signal is louder than the loudspeaker signal by a given value;
  setting a damping of the reception attenuator to the first damping value and the damping of the transmission attenuator to the second damping value, if the reception attenuator is set at the second damping value and a reception signal recognized as a speech signal is louder than the transmission signal by a given value; and for
  retaining the previously set damping values in all other situations.

In accordance with another feature of the invention, each of the signal/noise detectors includes an input and an output, a rectifier at the input, a compander connected to the rectifier, a first low-pass filter connected to the compander, a second low-pass filter connected to the first low-pass filter, and an evaluation circuit at the output, the evaluation circuit receiving an input signal of the second low-pass filter, after a controllable offset signal and an output signal of the second low-pass filter has been subtracted therefrom.

In accordance with again another feature of the invention, the second low-pass filter in each of the signal/noise detectors has an adjustable time constant and a control input; each of the signal/noise detectors comprises a peak-value detector with an adjustable fading time constant connected downstream of the first low-pass filter and a control input; the control inputs of the peak-value detector and of the second low-pass filter being connected to the evaluation circuit for time constant adjustment.

In accordance with yet another feature of the invention, the comparator circuit includes a comparator having an output supplying an output signal to the control logic and an input, peak-value detectors with a given time constant connected to the inputs of the comparator, logarithmic amplifiers connected to inputs of the peak-value detectors, level- matching units connected to inputs of the logarithmic amplifiers, wherein the control logic has switching means for:
  if the reception attenuator is set at the second damping value, for connecting the reception signal and the transmission signal to one of the level- matching units, and for superimposing an offset signal corresponding to a difference between the reception signal and the transmission signal on the signals at the input of the comparator; and,
  if the transmission attenuator is set at the second damping value, for connecting the loudspeaker signal and the microphone signal to one of the level-matching units, and for superimposing an offset signal corresponding to a difference between the microphone signal and the loudspeaker signal on the signals at the input of the comparator.

In accordance with again a further feature of the invention, attenuations and gains in the level-matching units are set in dependence on a control signal issued by the control logic.

Finally, in accordance with a concomitant feature of the invention, the peak-value detectors receive control signals from the control logic.

In other words, a comparison unit or comparator circuit compares the signal supplied to the loudspeaker and the microphone signal to one another, and it compares the transmission signal and the reception signal to one another, in respect of a quantity to be assigned to the particular signal loudness. The comparator circuit is coupled to the control logic. The control logic, if the transmission attenuator is set to the second damping value, and in the event of a microphone signal recognized as being a speech signal louder than the loudspeaker signal by a particular amount, adjusts the attenuation of the transmission attenuator equal to the first damping value and the attenuation of the reception attenuator equal to the second damping value. If the reception attenuator is set to the second damping value, and in the event of a reception signal recognized as being a speech signal louder than the transmission signal by a particular amount, sets the reception attenuator to the first damping value and the transmission attenuator to the second damping value. In all other cases the present damping values are maintained. Other modes and features which are considered as characteristic for the invention are set forth in the appended claims.

Although the invention is illustrated and described herein as embodied in a method of automatic speech direction reversal and circuit configuration for implementing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
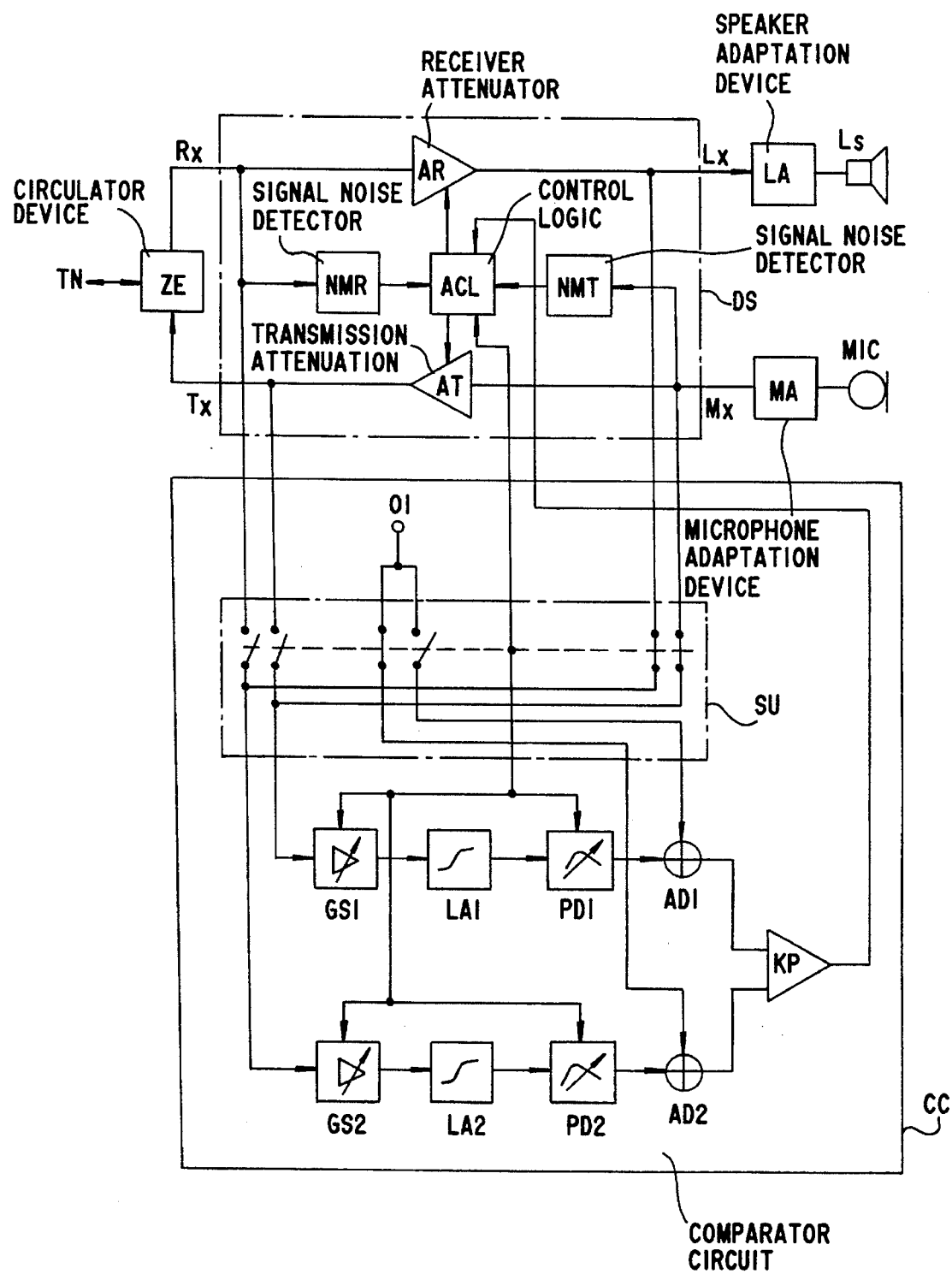
FIG. 1 is a block circuit diagram illustrating a preferred embodiment of the invention.

Referring now to the figures of the drawing in detail, and first, particularly, to FIG. 1 thereof, bidirectional transmission signals across a telephone line or telephone network TN are split up into a reception signal or receive signal Rx and a transmission or transmit signal Tx in a circulator device ZE. The reception signal Rx and the transmission signal Tx are sent to or taken from an automatic speech direction reversal device DS according to the invention.

Furthermore, a loudspeaker LS to which a signal Lx is supplied and which is connected to the speech direction reversal device DS across a loudspeaker adaptation unit LA, and a microphone MIC that puts out a signal Mx is connected to DS across a microphone adaptation unit MA. The speech direction reversal device DS has a controllable reception or receive attenuator AR, at whose input the reception signal Rx is present and at whose output the signal Lx is present, and a controllable transmission or transmit attenuator AT, at whose input the signal Mx is present and at whose output the transmission signal Tx is present. A control logic ACL is provided for controlling the reception and transmission attenuators AR, AT, which in turn is actuated by two signal/ noise detectors NMR, NMT. One signal/noise detector NMR is given the reception signal Rx and the other signal/noise detector NMT is given the signal Mx. But, in theory, it is also possible to feed the signal/noise detectors NMR, NMT with the signal Lx or the transmission signal Tx, since the signal Lx is proportional to the reception signal Rx and the transmission signal Tx is proportional to the signal Mx.

Furthermore, the control logic ACL is coupled to a comparator circuit CC, which, first, compares the signals Lx and Mx to each other, as well as the signals Tx and Rx to each other, with respect to a value that is assigned to the particular signal loudness. The comparison of the individual pairs of signals to each other can occur continually and consecutively, in which case one pair of signals should be selected according to certain criteria, or only the pair of signals critical to the particular operating condition need be compared.

In the exemplary embodiment shown in FIG. 1, the latter possibility is realized. The comparator circuit CC contains a comparator KP, whose output signal is taken to the control logic ACL and whose inputs are each connected to a peak detector PD1 and PD2. The two peak detectors PD1 and PD2 have a discharge time constant of 512 ms, for example, or they work with a fixed decrement value, since the peak-value detectors PD1 and PD2 work in a strict logarithmic manner because of logarithmic amplifiers LA1 and LA2. Each peak detector is connected to a logarithmic amplifier LA1 and LA2, respectively. The logarithmic amps LA1 and LA2 produce a compression of the signal supplied to them and thus reduce the dynamic range required by the peak detectors PD1 and PD2. Furthermore, the compression accomplishes an evaluation which corresponds to a sense of loudness. The logarithmic amps LA1 and LA2, in turn, are each connected to a level matching stage GS1 and GS2, which generate a constant attenuation or amplification value to be anticipated on the basis of the acoustic echo or the input echo or cradle echo. Each level matching stage GS1 and GS2 can, in turn, be divided into two amplifier stages. A first stage GS2a could simulate the echo path, thus taking into account a possible signal clipping, due to the finite control range. Such signal clipping can be caused by a possible level magnification or amplification between the signal Lx supplied to the loudspeaker and the signal Mx put out by the microphone. The second stage GS2b would accomplish a necessary derivative action, due to the signal transit time. GS1, like GS2, could be built from two amplifier stages. Depending on the operation, whether the signals Lx and Mx or the signals Tx and Rx are compared to each other, the amplifier stages GS1 and GS2, and the peak detectors PD1 and PD2, can be adjusted differently. The control logic ACL switches to the values assigned to the operating mode each time. Alternatively, the amplifier stages GS1 and GS2 could also be hooked up between the logarithmic amplifiers LA1 and LA2 and peak detectors PD1 and PD2, respectively.

With a switching unit SU, either the reception signal Rx and the transmission signal Tx or the signal Lx supplied to the loudspeaker and the signal Mx put out by the microphone are connected to the level matching stages GS1 and GS2. Furthermore, the switching unit SU connects an offset signal 01, depending on the operating mode, to an input of the comparator KP. The offset signal 01 is supplied either to an adder AD1 or an adder AD2, which adds the offset signal 01 to the output signal of the phase detector PD1 or PD2, depending on the operating mode. The switching unit SU is controlled by the control unit ACL, which also evaluates the output signal of the comparator KP.

The decrements of the peak-value detectors PD1 and PD2, as well as the amplifier elements GS1 and GS2, could be made capable of being switched in each operating mode. This would produce two working states per operating mode. On the acoustic level, where the signals Lx and Mx are compared to each other, the reception signal Rx can be switched in accordance with whether it is classified as speech or noise. This would allow a distinction between the following system behaviors: transient, but large level magnification during speech, owing to resonance and direct coupling, are optimally controlled with larger GS1 and larger decrement or smaller time constant, while in the case of noise alone after a holding period with a second parameter set GS1 and PD1, only the level magnification caused by the room echo and the indirect coupling is placed on lead. At the line side, where the signals Tx and Rx are compared to each other, it is possible to take into account the different echo properties in dependence on the input signal Mx, classified as speech or noise. Thus, for instance, in the case of speech, it is possible to check the near echo plus the far echo and, in the case of noise, only the near echo of the cradle itself can be compensated for its level.

During operation of the configuration shown in FIG. 1, it is provided for the reception signal Rx with variable damping to be supplied to the loudspeaker LS as the signal Lx, and for the signal Mx, also with variable damping, to be used as the transmission signal Tx. The setting of the particular attenuation (or gain) is done in dependence on the reception signal Rx and the signal Mx. For this, both signals are continually classified as speech signal or noise. In the event that one of the two signals has been classified as a speech signal, the attenuation of this signal is set to a first damping value D1 and the other signal is set at a second damping value D2 and this continues until the signal is again classified as noise. In the event that both signals are classified as speech signals, the attenuations are adjusted in accordance with the signal first recognized as being speech. In the event that both signals are classified as noise, both attenuations are set to a third damping value, lying between the first and second.

Figure 2:
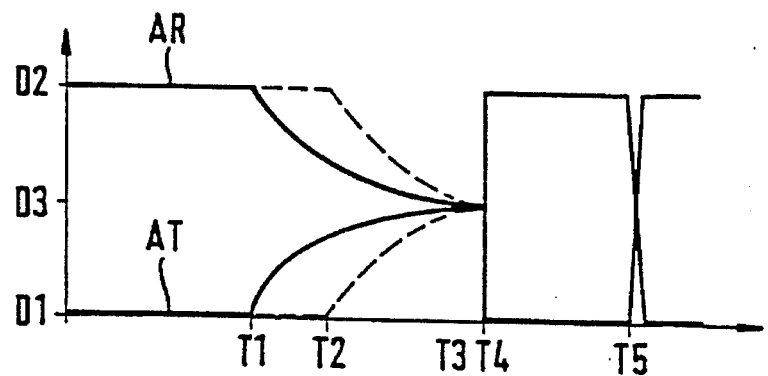
FIG. 2 is a graph illustrating an exemplary course of damping attained with the method according to the invention.

Referring specifically to FIG. 2, the transition from the first or second damping value D1, D2 to the third damping value D3 occurs more slowly than a transition from the third damping value D3 to the first or second damping value D1, D2 or a transition from the first damping value D1 to the second damping value D2 or vice versa. Here, the signal Mx is initially classified as speech signal and the reception signal Rx as noise. Therefore, the attenuation of signal Rx is equal to the second damping value D2 and the attenuation of signal Mx is equal to D1, while D1 is equal to zero attenuation. The setting of the attenuation is done in accordance with the reception attenuator for the reception signal Rx and with the transmission attenuator for the signal Mx. At a time T1, the signal Mx changes, so that both signal/noise detectors NMR, NMT now classify the respective signals Rx, Mx as noise. The transition of the attenuation from the value D2 to the value D3 for the reception signal Rx and the transition of the attenuation from the value D1 to the value D3 for the signal Mx occurs steadily up to a time T3, where both damping values remain until a time T4. At time T4, the signal Mx is again recognized as a speech signal. Thereupon, the attenuation of the signal Mx is changed with a steep edge to the damping value D1 and the reception signal Rx is changed to the value D2. At time T4, the direction of speech changes, so that the attenuations are also correspondingly reversed. According to the invention, the particular listener now has the ability to change the speech direction by drowning out the speaker (or an interference signal recognized as speech) with an appropriately louder speech.

The comparator circuit CC, depending on the particular operating mode, compares either the signal Lx supplied to the loudspeaker and the microphone signal Mx to each other, or the transmission signal Tx and the reception signal Rx to each other, in regard to a value that can be associated with the particular signal loudness. With the transmission attenuator AT set to the second damping value, and in the event that a microphone signal Mx recognized as a speech signal is louder than the loudspeaker signal Lx by a particular amount, the control logic ACL sets the attenuation of the transmission attenuator AT equal to the first damping value and the attenuation of the reception attenuator AR equal to the second damping value; and with the reception attenuator AR set to the second damping value, in the event that a reception signal Rx recognized as speech signal is louder than the transmission signal Tx by a particular amount, it sets the receive attenuator AR to the first damping value and the attenuation of the transmission attenuator AT to the second damping value. This means that, depending on the speech direction, one of the signal pairs are examined, namely the receive and transmission signal Rx, Tx on the one hand, and the loudspeaker and microphone signal Lx, Mx on the other hand, and when the difference is significant, given in the example by the offset signal 01 and the gain/attenuation of the level matching stage GS1 or GS2, a change in the speech direction occurs. In all other cases, the attenuations determined by the control logic ACL through the signal/noise detectors NMR, NMT are retained.

The switching unit SU is accordingly controlled through the control logic ACL. Instead of a single comparator circuit or evaluator unit CC, which switches between the two pairs of signals, it is also possible to have two separate comparator units, and the control logic ACL will only consider the comparison result that is of interest in the particular operating mode. Furthermore, an additional switching variant is achieved in that, instead of one offset signal, two different offset signals are provided, each being switched to one input of the comparator KP, or one differential offset signal is provided, which is switched to both inputs, inverted or noninverted, depending on the operating mode. Moreover, instead of one peak-value detection, it is also possible to measure the power of the individual signals and compare them for an evaluation of the signal loudness, for example. In an embodiment with only one comparator circuit, the level matching stages GS1 and GS2 are matched to the particular attenuation relationships in accordance with the particular speech direction. In the operation of the configuration shown in FIG. 1, the reception signal Rx is supplied to the loudspeaker LS with variable damping as the signal Lx and the signal Mx, also with variable damping, is used as the transmission signal Tx. The setting of the particular attenuation depends on the reception signal Rx and the signal Mx. For this, both signals are continually classified as speech signal or noise and compared to one another in terms of loudness. In the event that one of the two signals has been classified as a speech signal, the attenuation of this signal is set to a first damping value D1 and the other signal is set to a second damping value D2.

In accordance with the invention, the transition of the attenuations at time T1, produced by the change in signals, occurs only at time T2, after a given delay elapses, if the reception signal Rx and the signal Mx are classified as noise at time T1. The length of the transition can be kept the same or, as indicated, also be performed in less time.

In order to classify the reception signal Rx and the signal Mx as speech signal or noise, the value of the respective signal Rx, Mx is first represented and then an amplitude companding is carried out. After a first low-pass filtering with a given time constant, a peak-value detection with two alternative fading or decay time constants, and a second low-pass filtering with two alternative time constants, the signal after the peak-value detection, subtracting an offset signal, is compared to the signal after the second low-pass filtering. The signal is classified as a speech signal and, consequently, the greater time constant is set for the peak-value detection and the second low-pass filtering if the signal after the peak-value detection and subtracting the offset signal is larger than the signal after the second low-pass filtering. If not, the signal is classified as noise and the smaller time constant is set for the peak-value detection and second low-pass filtering. In many applications, it is also possible to do without the peak-value detection and switching of time constants in the second low-pass filtering.

The classification of speech signals and noise is based on the fact that speech signals generally exhibit an envelope curve with distinct time structure and pronounced amplitude fluctuations, and therefore can be approximated as a pulselike signal. Noise, on the other hand, primarily involves relatively uniform, stationary signals. Thus, in order to distinguish a pulselike nature from a uniform nature, the signal under examination is first put through a low-pass filtered branch (second low-pass filtering) and then through a direct branch, in which only an offset signal, preferably a constant signal is subtracted from the signal. Pulselike signals are attenuated more strongly than uniform signals in the one branch by the low-pass filter. In the second branch, the type of signal makes no difference. Thus, when comparing the two branches, a distinction can be drawn in that pulselike signals furnish a lower value for the first branch than that for the second, and vice versa with uniform signals. Through the preceding low-pass filtering, in which short interference pulses are suppressed by the low-pass filtering (first low-pass filtering), the signals are more distinct in structure and easier to differentiate. The amplitude companding enhances the sensitivity during slight level control and thus achieves a faster activation of the signal/noise detector. A further improvement in the modification of the invention with peak-value detection and time-constant switching during the peak-value detection and second low-pass filtering is achieved in that a smaller time constant is used for uniform signals, than for pulselike signals. Accordingly, a change from noise to speech signal is immediately recognized, while the observation time is longer in the opposite situation, so that slight pauses in speaking are not enough to cause a switch.

Figure 3:
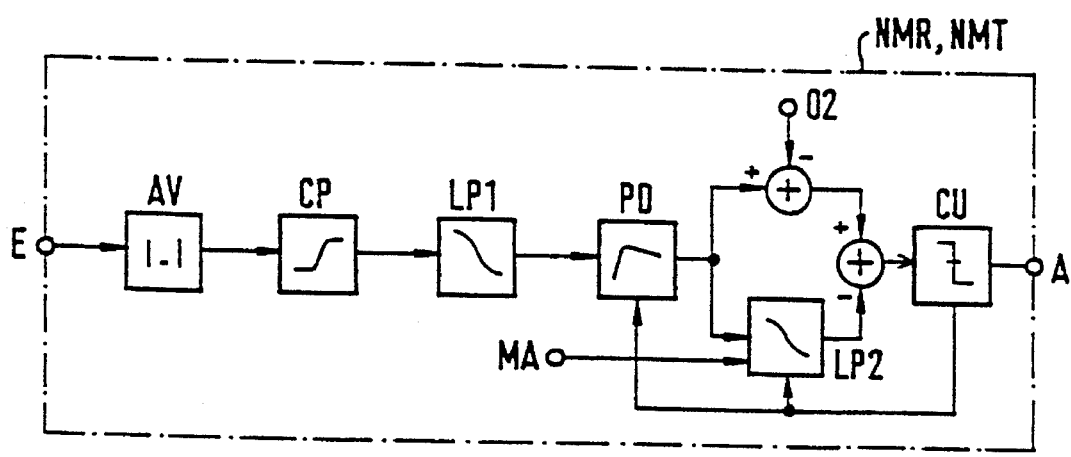
FIG. 3 is a block circuit diagram of an exemplary embodiment of a signal/noise detector.

Referring now to FIG. 3, the exemplary embodiment shows a signal/noise detector NMR, NMT which includes a rectifier AV at the input E. The rectifier AV is followed by a compander CP, which in turn is followed by a first low-pass filter LP1, connected to a peak detector PD with adjustable time constant. An evaluation circuit CU at the output A, to which the output signal of the peak-value detector PD after subtracting the offset signal 02 and after subtracting the output signal of the second low-pass filter LP2 is supplied, controls the time constants of peak-value detector PD and second low-pass filter LP2 across one output.

In a further modification of the invention, the time constant of the first low-pass filter LP1 in the signal/noise detector NMT for the signal Mx is larger than that of the first low-pass filter LP1 in the signal/noise detector NMR for the reception signal Rx. This has the advantage of diminishing the perturbing influence of echoes occurring on the transmission path between loudspeaker LS and microphone MIC.

Moreover, in the case of the signal Mx or the reception signal Rx, the signal upstream of the second low-pass filtering is set at a higher value than the instantaneous amplitude value if the classification of the other signal, i.e., the reception signal Rx or the signal Mx, changes from a speech signal to noise. A preferable value is the maximum representable amplitude value. This accomplishes an advantageously longer delay time for suppression of interfering echoes.

Furthermore, modifying the invention, the offset signal 02 can be adjusted separately for both signal/noise detectors NMR, NMT. In the exemplary embodiment shown, the offset signal 02 of the one signal/noise detector is set higher for a certain time if the other signal/noise detector has classified its reception signal as a speech signal. This suppresses interfering echoes even more efficiently. Furthermore, it is advantageous to keep the offset signal 02 and/or the instantaneous amplitude value of the other signal/noise detector for a certain time, in order to suppress perturbations after the transition from speech to noise in a signal/noise detector.

Preferably, the method of the invention is carried out by time- and amplitude-discrete signal processing. The advantages of this are a precise reproducibility without parameter scatter, better integrability with less external switching, and better compatibility with digital telecommunication networks, such as ISDN (Integrated Services Digital Network) systems. In the exemplary embodiment shown, the transmit and reception signals Tx, Rx and the signals Mx, Lx are digital. The microphone matching unit MA and the loudspeaker matching unit are provided for analog-digital and digital-analog conversion, among other things.

In a time- and amplitude-discrete system, low-pass filtering can be performed as follows: the digital signal to be filtered is multiplied with a constant factor a and added to the filtered digital signal that is delayed by a time value equal to the reciprocal of the clock cycle. From this is subtracted the signal, filtered and multiplied by the factor a, which represents the output signal. In this case, it is preferable to select the factor a equal to an n-th power of 2, so that multiplications can be replaced by much more easily implemented shift operations by n positions.

Figure 4:
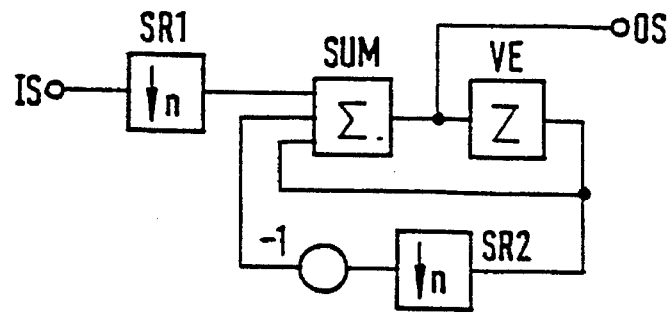
FIG. 4 is a block circuit diagram of an exemplary embodiment of a low-pass filter used herein.

FIG. 4 illustrates an exemplary circuit according to the invention. The signal IS being filtered is taken to a first shift register SR1 and arithmetically shifted n places to the right. The output of the shift register SR1 is taken to a summator SUM, which is also connected to the output of a delay element VE and, across a sign inverter −1, to the output of a second shift register SR2. The input of the second shift register SR2 is connected to the output of the delay element VE and is provided for arithmetic shifting of this signal n places to the right. The delay element VE is activated by the output of the summator SUM, which carries the output signal OS. The time constant TC of such a filter stage is computed in dependence on the number of places n shifted and in dependence on a time value DT, which is equal to the reciprocal of the clock phase, as follows:

$$TC = DT/\{-\ln(1-a)\} \text{ with } a = 2^2$$

According to FIG. 2, there is a transition from the damping value D2 to the value D3, for example, by continuous subtraction of the instantaneous damping value, arithmetically shifted k places to the right, from the instantaneous value until the smaller damping value is achieved. A transition from the damping value D1 to the value D3 is effected by continuous addition of the instantaneous value, arithmetically shifted k places to the right, until the larger damping value D2 or D3 is achieved. Once again, it is advantageous not to require any multiplication. However, other embodiments are equally possible in principle.

The method according to the invention ensures that, in any operating mode, especially if both speakers are active, the loop gain is smaller than unity. As opposed to conventional circuits, however, significantly less circuitry is needed to implement the method of the invention. Thanks to the slow and continuous transition to an damping value lying between the two extreme values, a more pleasant listening sensation is achieved when a speech signal changes to noise. This is further improved by an additional delay time between signal change and attenuation change, if the other party does not start talking, and by measures which prevent a switching caused by echoes.

We claim:

1. Method for automatic speech direction reversal, which comprises:

supplying a reception signal with variable damping to a loudspeaker, outputting a microphone signal with variable damping from a microphone as a transmission signal, continuously classifying each of the reception signal and the microphone signal as a speech signal or noise, setting a damping of one of the receive and transmission signals classified as a speech signal to a first damping value, setting the damping of the other of the reception and transmission signals to a second damping value being greater than the first damping value, maintaining the set damping values if both signals are classified as a speech signal, setting a damping of both reception and transmission signals to a third damping value lying between the first and second damping values, if both reception and transmission signals are classified as noise, comparing the variably damped signal supplied to the loudspeaker and the microphone signal to one another with regard to a value which can be correlated with a particular signal loudness, setting the damping of the microphone signal to the first damping value and the damping of the reception signal to the second damping value, if the damping of the microphone signal is set to the second damping value and in an event that the microphone signal which has been recognized as a speech signal is louder than the loudspeaker signal by a given, first difference; or maintaining the previous damping values; and setting the damping of the reception signal at the first damping value and the damping of the microphone signal at the second damping value if the damping of the reception signal is set at the second damping value and in the event that the reception signal recognized as the speech signal is louder than the transmission signal by a second, given difference; or, maintaining the previous damping values.

2. The method according to claim 1, which further comprises, in the comparing step, providing the quantity correlated with the particular signal loudness in the form of a particular signal amplitude multiplied by a weighting factor.

3. The method according to claim 2, which further comprises performing a transition from the second damping value to the third damping value by continuously subtracting an instantaneous damping value, arithmetically shifted to the right by k places, from the instantaneous damping value until the third damping value is reached, and performing a transition from the first damping value to the third damping value by continuously adding the instantaneous value, arithmetically shifted to the right by k places, until the third damping value is reached, wherein k is an integer.

4. The method according to claim 1, which further comprises performing a transition from one of the first and second damping values to the third damping value more slowly than a transition from the third damping value to one of the first and second damping value and more slowly than a transition from the first to the second damping value, and from the second to the first damping value.

5. The method according to claim 1, which further comprises waiting for a given delay time before a transition is performed for one of the reception signal and the microphone signal from one of the first and second damping values to the third damping value, after a change from a speech signal to noise is detected.

6. The method according to claim 1, wherein the continuously classifying step comprises the following steps:

defining a value for the microphone signal and the reception signal, respectively;

companding an amplitude thereof;

processing through a first low-pass filter with given time constants;

processing through a second low-pass filter with given time constants;

comparing the defined signal before the second low-pass filter, after subtracting an adjustable offset signal, to a corresponding signal after the second low-pass filter;

classifying the corresponding signal as a speech signal if the defined signal before the second low-pass filter, after subtracting the offset signal, is greater than the corresponding signal after the second low-pass filter, and classifying the defined signal as noise if the corresponding signal after the second low-pass filter is greater than the defined signal before the second low-pass filter, after subtracting the offset signal.

7. The method according to claim 6, which further comprises performing a peak-value detection with two alternative fading time constants after the first low-pass filter, providing two alternative time constants during the second low-pass filter, and setting the greater time constant for the peak-value detector and the second low-pass filter if the defined signal is classified as a speech signal, and setting the smaller time constant if the defined signal is classified as noise.

8. The method according to claim 6, which further comprises setting the time constant of the first low-pass filter for the microphone signal greater than the time constant for the reception signal.

9. The method according to claim 6, which further comprises setting an internal condition for one of the microphone signal and the reception signal during the second low-pass filtering at an amplitude value being greater than an instantaneous amplitude value of the particular signal, if the classification of the reception signal or the microphone signal changes from speech signal to noise and the particular signal is classified as noise.

10. The method according to claim 9, which further comprises setting the internal condition during the second low-pass filtering at a maximum amplitude value.

11. The method according to claim 9, wherein the reception signal and the microphone signal are input into respective ones of two signal/noise detectors as input signals, and the method further comprises, after switching from voice to noise in one signal/noise detector, maintaining the instantaneous amplitude value of the other signal/noise detector for a given time.

12. The method according to claim 6, wherein the reception signal and the microphone signal are input into respective ones of two signal/noise detectors as input signals, and the method further comprises increasing an offset signal of one of the signal/noise detectors if the other of the two signal/noise detectors classifies its input signal as a speech signal.

13. The method according to claim 12, which further comprises, after switching from voice to noise in one of the signal/noise detectors, maintaining the offset signal of the other of the signal/noise detectors for a given time.

14. The method according to claim 5, which further comprises, during at least one of the first and second low-pass filter, multiplying the respective signal of the microphone signal and the reception signal being filtered by a given factor to form a product, adding the product to a delayed and filtered signal to form a sum, and subtracting from the sum the delayed and filtered signal multiplied by the given factor.

15. The method according to claim 1, which comprises processing the microphone signal and the reception signal by time- and amplitude-discrete signal processing.

16. The method according to claim 15, which further comprises, during at least one of the first and second low-pass filter, multiplying the time- and amplitude-discrete signal being filtered by a given factor to form a product, adding the product to a delayed and filtered time- and amplitude-discrete signal to form a sum, and subtracting from the sum the delayed and filtered signal multiplied by the given factor.

17. The method according to claim 16, which further comprises setting the given factor equal to an n-th power of 2, and modelling the multiplying step with a shift operation by n places, n being an integer.

18. The method according to claim 15, which further comprises performing a transition from the second damping value to the third damping value by continuously subtracting an instantaneous damping value, arithmetically shifted to the right by k places, from the instantaneous damping value until the third damping value is attained, and performing a transition from the first damping value to the third damping value by continuously adding the instantaneous value, arithmetically shifted to the right by k places, until the third damping value is attained.

19. In a circuit configuration for automatic speech direction reversal, of the type having a loudspeaker; a controllable reception attenuator having an input receiving a reception signal and an output supplying a loudspeaker signal activating said loud-speaker; a microphone supplying a microphone signal; a controllable transmission attenuator having an input receiving the microphone signal and an output supplying a transmission signal; a first signal/noise detector receiving the reception signal or the loudspeaker signal and a second signal/noise detector receiving the microphone signal or the transmission signal; wherein the reception signal and the transmission signal are continuously classified as speech signal or noise; and having a control logic connected at outputs of said first and second signal/noise detectors and controlling said reception and transmission attenuators, wherein said control logic sets a damping of a particular signal branch whose signal has been classified as a speech signal to a first damping value and the other particular signal to a second damping value being higher than the first, and when both signals are classified as noise, said control logic sets a third damping value located between the first and second damping values, the improvement which comprises:

a comparator circuit connected to said control logic, said comparator circuit having means for comparing the loudspeaker signal with the microphone signal, and the transmission signal with the reception signal, with respect to a quantity that can be correlated with a particular signal loudness;

said control logic having means for:
setting a damping of said transmission attenuator to the first damping value and the damping of said reception attenuator to the second damping value, if said transmission attenuator is set at the second damping value and the microphone signal recognized as a speech signal is louder than the loudspeaker signal by a given value;
setting a damping of said reception attenuator to the first damping value and the damping of said transmission attenuator to the second damping value, if said reception attenuator is set at the second damping value and a reception signal recognized as a speech signal is louder than the transmission signal by a given value; and for retaining the previously set damping values in all other situations.

20. The circuit configuration according to claim 19, wherein each of said first and second signal/noise detectors includes an input and an output, a rectifier at said input, a compander connected to said rectifier, a first low-pass filter connected to said compander, a second low-pass filter connected to said first low-pass filter, and an evaluation circuit at said output, said evaluation circuit receiving an input signal of said second low-pass filter, after a controllable offset signal and an output signal of said second low-pass filter has been subtracted therefrom.

21. The circuit configuration according to claim 20, wherein said second low-pass filter in each of said first and second signal/noise detectors has an adjustable time constant and a control input; each of said first and second signal/noise detectors comprises a peak-value detector with an adjustable fading time constant connected downstream of said first low-pass filter and a control input; said control inputs of said peak-value detector and of said second low-pass filter being connected to said evaluation circuit for time constant adjustment.

22. The circuit configuration to claim 21, wherein said peak-value detectors receive control signals from said control logic.

23. The circuit configuration according to claim 19, wherein said comparator circuit includes a comparator having an output supplying an output signal to said control logic and an input, peak-value detectors with a given time constant connected to said inputs of said comparator, logarithmic amplifiers connected to inputs of said peak-value detectors, level-matching units connected to inputs of said logarithmic amplifiers, wherein said control logic has switching means for:

if said reception attenuator is set at the second damping value, for connecting the reception signal and the transmission signal to one of said level-matching units, and for superimposing an offset signal corresponding to a difference between the reception signal and the transmission signal on the signals at said input of said comparator; and, if said transmission attenuator is set at the second damping value, for connecting the loudspeaker signal and the microphone signal to one of said level-matching units, and for superimposing an offset signal corresponding to a difference between the microphone signal and the loudspeaker signal on the microphone signal and the reception signal at the input of said comparator.

24. The circuit configuration according to claim 23, wherein attenuations and gains in said level-matching units are set in dependence on a control signal issued by said control logic.

\* \* \* \* \*